(12) United States Patent
Holtstiege et al.

(10) Patent No.: US 11,414,919 B2
(45) Date of Patent: *Aug. 16, 2022

(54) INSULATING GLAZING UNIT

(71) Applicant: SAINT-GOBAIN GLASS FRANCE, Courbevoie (FR)

(72) Inventors: Thomas Holtstiege, Schwelm (DE); Alicia Dröge, Aachen (DE); Christian Effertz, Aachen (DE); Christopher Marjan, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 76 days.

This patent is subject to a terminal disclaimer.

(21) Appl. No.: 16/978,933

(22) PCT Filed: May 8, 2019

(86) PCT No.: PCT/EP2019/061758
§ 371 (c)(1),
(2) Date: Sep. 8, 2020

(87) PCT Pub. No.: WO2019/219461
PCT Pub. Date: Nov. 21, 2019

(65) Prior Publication Data
US 2020/0408031 A1    Dec. 31, 2020

(30) Foreign Application Priority Data
May 14, 2018    (EP) .................................... 18172066

(51) Int. Cl.
*E06B 3/663* (2006.01)
*E06B 3/66* (2006.01)
*H04W 4/80* (2018.01)

(52) U.S. Cl.
CPC ............ *E06B 3/663* (2013.01); *E06B 3/6612* (2013.01); *H04W 4/80* (2018.02)

(58) Field of Classification Search
CPC ........ E06B 1/12; E06B 3/663; E06B 3/66309; E06B 7/28; G06K 19/07758; H04B 1/59; H01Q 1/1271
See application file for complete search history.

(56) References Cited

U.S. PATENT DOCUMENTS 2,684,266 A    7/1954    Englehart
8,384,520 B2*  2/2013    Fourreau ............... B64C 1/1484
                                                   701/14
(Continued)

FOREIGN PATENT DOCUMENTS

CN    103649826 A    3/2014
EP    3 287 998 A1   2/2018
(Continued)

OTHER PUBLICATIONS

International Search Report as issued in International Patent Application No. PCT/EP2019/061758, dated Jul. 16, 2019.
(Continued)

*Primary Examiner* — Christine T Cajilig
(74) *Attorney, Agent, or Firm* — Pillsbury Winthrop Shaw Pittman LLP

(57) ABSTRACT

An insulating glazing unit has at least two glass panes and a circumferential spacer profile between them near their edges, for use in a window, a door, or a façade glazing, and which has in each case a frame, in particular a metallic frame, surrounding the edges of the insulating glazing, wherein at least one RFID transponder is attached to the insulating glazing unit as an identification element, wherein the at least one transponder is arranged on an inner surface of one of the glass panes in the spaced region between the spacer profile and the edge of the glass pane.

8 Claims, 5 Drawing Sheets

(56) References Cited

U.S. PATENT DOCUMENTS

Figure 1:
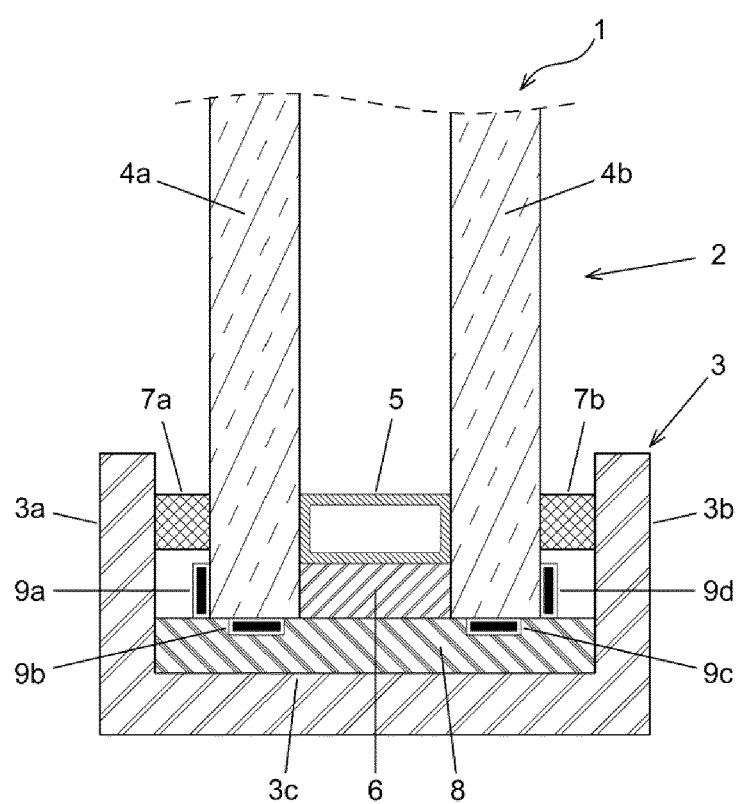

| | | | |
|---|---|---|---|
| 10,303,035 B2* | 5/2019 | Brown | E06B 9/24 |
| 2006/0238355 A1 | 10/2006 | Kokuryo | |
| 2008/0129499 A1* | 6/2008 | Masuzaka | G08B 13/04 |
| | | | 340/545.1 |
| 2009/0243802 A1* | 10/2009 | Wolf | E06B 3/66309 |
| | | | 156/60 |
| 2011/0133940 A1 | 6/2011 | Margalit et al. | |
| 2017/0167185 A1* | 6/2017 | Boer | E06B 1/6061 |
| 2017/0167186 A1* | 6/2017 | Messere | E06B 3/66314 |
| 2020/0082240 A1* | 3/2020 | Heitmar | E06B 7/28 |
| 2020/0193259 A1 | 6/2020 | Thangamani et al. | |

FOREIGN PATENT DOCUMENTS

| | | | | |
|---|---|---|---|---|
| EP | 3287998 A1 * | 2/2018 | | E06B 3/6612 |
| FR | 2 787 134 A1 | 6/2000 | | |
| FR | 2 787 135 A1 | 6/2000 | | |
| FR | 2787135 A1 * | 6/2000 | | B32B 17/10036 |
| FR | 2 928 763 A1 | 9/2009 | | |
| JP | 2010-224968 A | 10/2010 | | |
| WO | WO 00/36261 A1 | 6/2000 | | |
| WO | WO-0036261 A1 * | 6/2000 | | B32B 17/10036 |
| WO | WO 2007/137719 A1 | 12/2007 | | |
| WO | WO 2012/125348 A2 | 9/2012 | | |
| WO | WO 2019/219460 A1 | 11/2019 | | |
| WO | WO 2019/219462 | 11/2019 | | |

OTHER PUBLICATIONS

International Search Report as issued in International Patent Application No. PCT/EP2019/061757, dated Jul. 12, 2019.
International Search Report as issued in International Patent Application No. PCT/EP2019/061760, dated Jul. 12, 2019.
Office Action as issued in Chinese Patent Application No. 201980032262.7, dated Dec. 21, 2021.
Non-Final Office Action as issued in U.S. Appl. No. 17/055,772, dated Mar. 14, 2022.
Notice of Allowance as issued in U.S. Appl. No. 17/055,793, dated May 26, 2022.

* cited by examiner

INSULATING GLAZING UNIT

CROSS-REFERENCE TO RELATED APPLICATIONS

This application is the U.S. National Stage of PCT/EP/2019/061758, filed May 8, 2019, which in turn claims priority to European patent application number 18172066.5 filed May 14, 2018. The content of these applications are incorporated herein by reference in their entireties.

The invention relates to an insulating glazing unit that has at least two glass panes and a circumferential spacer profile between them near their edges for use in a window, a door, or a façade glazing, which has, in each case, a frame surrounding the edges of the insulating glazing, wherein at least one RFID transponder is attached to the insulating glazing unit as an identification element. It further relates to a window, a door, and a façade glazing, formed with such an insulating glazing unit.

Modern windows, doors, and façade glazings, at least for use in northern and temperate latitudes, are usually produced using prefabricated insulating glazing units that have the aforementioned structure, but, optionally, can include even more than two glass panes in the combination. Such insulating glazing units are mass-produced, shipped, and also independently marketed products that should be clearly identifiable on their way to an end product and possibly even during maintenance and servicing.

It is already known to provide insulating glazing units with such identifying markings and certain requirements of manufacturers and users have arisen in the related practice:

[1] The identifying marking should not be visible either from the inside or from the outside.

[2] The marking should be "readable" from a distance between 30 cm and 1 m.

[3] The marking should be as forgery-proof as possible, i.e., it should not be readily possible to overwrite or to copy it.

The effectiveness of conventional identifying markings, such as barcodes or QR codes, is based on their visibility, which means at least one restriction under the above aspect [1]. Meeting the requirement [2] is also difficult therewith.

It has also been proposed to provide insulating glazing units with "electronic" identifiers, in particular via radio readable identifiers, so-called "RFID transponders". Such insulating glazing units are, for example, disclosed in WO 00/36261 A1 or WO 2007/137719 A1.

Certain types of window and door frames, but especially façade constructions in which insulating glazing units are installed are made entirely or at least partially of a metal (aluminum, steel . . . ), which interrupts or at least greatly attenuates the passage of radio waves from or to the RFID transponder on the insulating glazing unit. For this reason, meeting the above requirement [2] has, in particular, proved difficult. Known insulating glazing units provided with RFID transponders are, consequently, not readily usable with metallic frame constructions. This reduces the potential range of application of glazing units identified in this manner and thus the acceptance of these marking solutions by manufacturers and users.

The object of the invention is, consequently, to provide an improved insulating glazing unit of the aforementioned type that is, in particular, not problematic for use even in frame constructions made at least to a considerable extent of a metal and that also ensures meeting the aforementioned requirements in such installation situations.

This object is accomplished by an insulating glazing unit with the features of claim 1, i.e., by the fact that the transponder or at least one transponder is arranged on an inner surface of one of the glass panes in the spaced region between the spacer profile and the edge of the glass pane. Expedient further developments of the idea of the invention are the subject matter of the dependent claims.

The invention is a result of extensive experimental investigations undertaken on insulating glazing units with the aforementioned basic structure, wherein, in particular, the spacer is a desiccant-filled hollow profile that is made of metal or is coated at least in sections with a metal foil, and wherein a (likewise circumferential) sealant strip is applied on the pane outer surface of the spacer profile. With regard to the application situation, the inventors carried out, in particular, investigations on insulating glazing units embedded in metallic frames, wherein spacers are positioned on the rebate base of the frame and elastomer sealing strips are arranged between the outer sides of the glass panes and the inner side of the adjacent upright frame rebates. Commercially available RFID transponders, whose structure and functionality are well known and, consequently, need not be further described here, were used in the investigations. The radio wavelengths used in such transponder systems are usually in the range between 125 kHz and 960 MHz (rarely between 2.45 GHz and 5.8 GHz) and penetrate both wood and conventional plastics but not metals. The findings of the inventors apply in principle to both passive and active RFID transponders.

With regard to metal frames that surround an insulating glazing unit and that, based on elementary laws of physics and according to the knowledge of the person skilled in the art based thereon, should sensitively interfere with, if not completely suppress, the HF radiation of RFID transponders placed near the edge or their antennas, the proposed solution is surprising. It yields the unforeseen advantage that an RFID transponder placed according to the invention can still be read out without problems and reliably at a relatively large distance of 0.5 to 1 m from a window, a door, or a façade glazing in which the insulating glazing unit is installed.

In expedient embodiments of the invention, at least one transponder is placed at a corner of the insulating glazing unit. In one embodiment, it is arranged at a predetermined corner, which is specified based on a predetermined installation position of the insulating glazing unit in the frame. This embodiment enables quickly identifying an installed insulating glazing unit, without having to search all corners as to whether the transponder delivering the identification is placed there or elsewhere.

In another embodiment, provision is made to arrange a transponder at each corner of the insulating glazing unit. This embodiment is somewhat more complicated to manufacture than the aforementioned and enables, as a result, quick identification of every insulating glazing unit so equipped regardless of whether specifications had been made for a prescribed installation position and whether these are actually complied with.

In another embodiment, the RFID transponder is electromagnetically or electrically coupled or connected to a conductive spacer profile or a conductive section of a spacer profile such that the spacer profile/the section of the spacer profile acts as an antenna of the transponder.

Figure 2A:
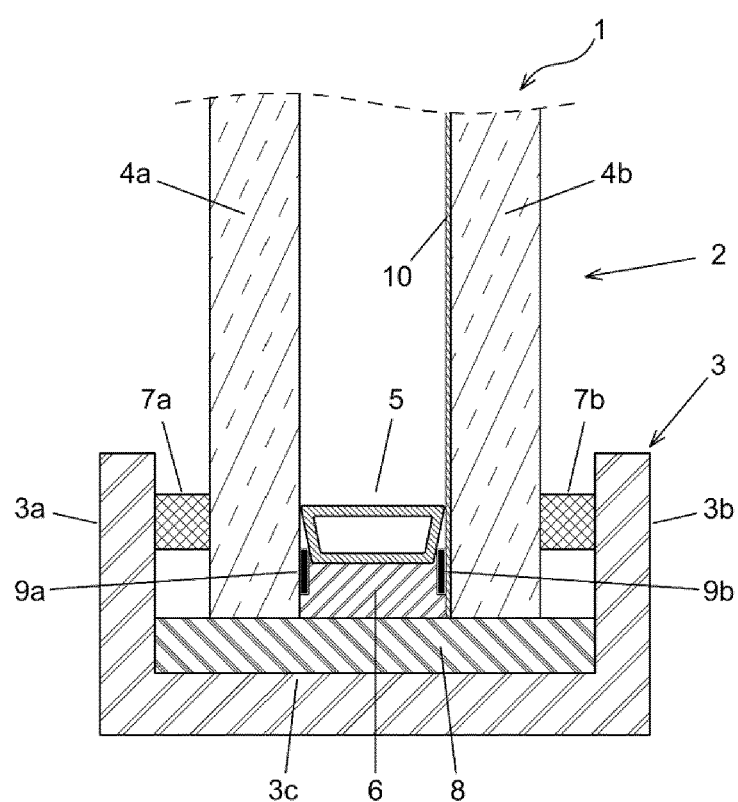
Figure 2B:
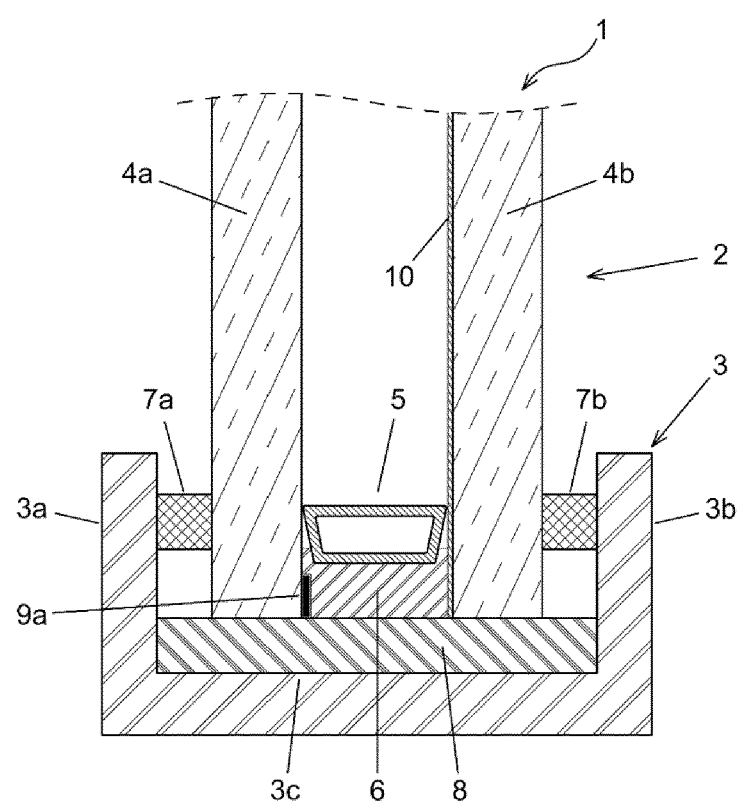
Figure 3:
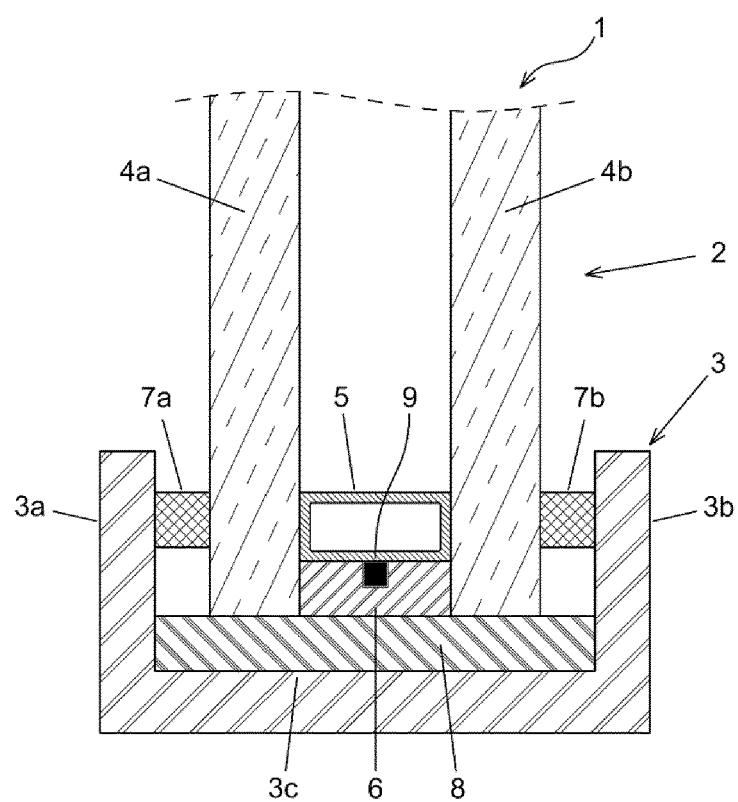
Figure 4:
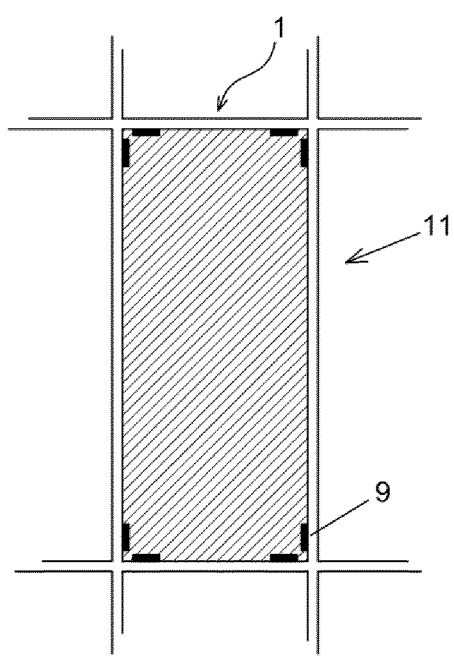

Advantages and functionalities of the invention are also evident from the following description of exemplary embodiments with reference to the figures. They depict:

FIG. 1 a detailed view (cross-sectional representation) of an edge region of a window in which an insulating glazing unit with transponders is installed, FIG. 2A a detailed view (cross-sectional representation) of an edge region of a window in which an insulating glazing unit in accordance with an embodiment of the invention is installed, FIG. 2B a detailed view (cross-sectional representation) of an edge region of a window in which an insulating glazing unit in accordance with another embodiment of the invention is installed, FIG. 3 a detailed view (cross-sectional representation) of an edge region of a window in which an insulating glazing unit with a transponder is installed, and FIG. 4 a schematic representation (plan view) of a section of a façade glazing in which an insulating glazing unit according to the invention is installed.

In the figures as well as the following description, the insulating glazing units as well as the window and the individual components are in each case identified with the same reference characters regardless of the fact that the specific embodiments differ.

FIG. 1 depicts an edge region of an insulating glazing unit 1, inserted into a metal frame 3 substantially U-shaped in cross-section and surrounding the end face of the insulating glazing unit as parts of an insulating window 2.

In this embodiment, the insulating glazing unit 1 comprises two glass panes 4a and 4b that are held apart at a predetermined distance by a spacer profile 5 placed between the glass panes near the end face. The spacer profile 5 is usually hollow and filled with a desiccant (not shown) that, via small openings (also not shown) on the inside, binds any moisture that has penetrated into the interpane space. The interpane space between the glass panes 4a and 4b is evacuated or filled with a noble gas, such as argon. An elastomer seal (sealing profile) 6 is introduced in the edge region of the insulating glazing unit 1, between the glass panes 4a and 4b and outside the spacer profile 5. This is shown here, simplified, as one piece. In practice, it usually comprises two components, one of which seals between spacers and glass and the other also additionally stabilizes the insulating glazing unit.

In the embodiment depicted in FIG. 1, the respective intermediate space between the two upright rebate walls 3a, 3b of the frame 3 and the adjacent glass pane 4a or 4b is also sealed with an elastomer profile 7a or 7b. In the rebate base 3c of the frame 3, spacers 8 are positioned at specified points of the longitudinal extension of the frame, which spacers extend substantially over the complete width of the rebate base 3c and thus completely support the end face of the insulating glazing unit 1 in a point-wise manner. Such spacers are usually manufactured from a plastic that is firm but not brittle up to certain extent and is also flexible at points.

The insulating glazing unit 1 of FIG. 1 is, by way of example, provided with a total of four RFID transponders 9a to 9d. Of these, the transponders 9a and 9d are applied at the boundary edge of the glass pane 4a or 4b on their outer surface, in each case, whereas the transponders 9b and 9c are applied on the end edge of the glass panes 4a and 4b respectively. This exemplary arrangement serves to illustrate the mounting possibilities of the transponders with an insulating glazing unit in accordance with a first embodiment of the invention; in practice, normally only one or two of the possible mounting positions shown here will be occupied. When mounted on the pane surface, the or each transponder can also be at some distance from the edge.

FIG. 2A depicts a modified construction in which the glass pane 4b has an interior-side coating (possibly a thermal protection coating) 10.

In the case of this embodiment, two transponders 9a, 9b are depicted, applied in each case on the interior-side surfaces of the glass panes 4a or 4b, and, in fact, in the edge region between the spacer profile 5 and the sealing profile 6 sealing the insulating glazing unit. Since the spacer profile 5 is, in this embodiment, trapezoidal in cross-section, i.e., somewhat tapered toward the end edge of the insulating glazing unit, there is, at that location, a small gap relative to the adjacent glass surface into which commercially available transponders can be partially inserted. Here again, in practice, only one of the two mounting positions will normally be occupied by a transponder.

FIG. 2B depicts another modified construction in which the glass pane 4b has an interior-side coating 10 that can cover the glass completely or only partially.

In the case of this embodiment, only one transponder 9a is shown. The transponder 9a is arranged on the interior-side surfaces of the glass panes 4a and, in fact, between the sealing profile 6 and the glass pane 4a. Here, the transponder 9a has no touching contact with the spacer profile 5 and preferably has a distance of 0.1-2 mm from the spacer profile. The amplifying effect of the signal strength depends on the distance of the transponder from the spacer.

FIG. 3 depicts a modification of the window structure shown in FIG. 2 and described above, whose only difference is the provision of a single RFID transponder 9 and its positioning centrally between the glass panes 4a and 4b at the outer surface of the spacer profile 5, embedded in the adjacent surface of the sealing profile 6.

FIG. 4 depicts schematically, using the example of a façade glazing 10, the attachment of transponders 9 in the corner regions of an insulating glazing unit 1. Investigations by the inventors showed that such an arrangement has a positive effect on the reception/transmission characteristics and increases the achievable reading distance of the transponders. As depicted in the figure, transponders with an elongated housing can be attached in the vicinity of the corners both on the long and the short sides of the insulating glazing unit, and, in fact, in principle in any of the ways shown in FIGS. 1 to 3 and described above.

The embodiment of the invention is not restricted to the above-described examples and highlighted aspects of the embodiments, but is also possible in a large number of modifications that are evident to the person skilled in the art from the dependent claims.

LIST OF REFERENCE CHARACTERS 1 insulating glazing unit
2 window
3 frame
3a, 3b upright rebate walls
3c rebate base
4a, 4b glass panes
5 spacer profile
6 sealing profile of the insulating glazing unit
7a, 7b elastomer profile on the frame
8 spacer
9, 9a-9d RFID transponder
10 façade glazing

The invention claimed is:

1. An insulating glazing unit comprising at least two glass panes and a circumferential spacer profile between the at least two glass panes near their edges, for use in a window, a door, or a façade glazing, which has a frame surrounding the edges of the insulating glazing,
   wherein at least one RFID transponder is attached to the insulating glazing unit as an identification element,
   wherein the at least one RFID transponder is arranged on an inner surface of one glass pane of the at least two glass panes in a spaced region between the spacer profile and the edge of the glass pane, and
   wherein the at least one RFID transponder is electrically connected to a conductive spacer profile or to a conductive section of the conductive spacer profile such that the conductive spacer profile or the conductive section of the conductive spacer profile acts as an antenna of the at least one RFID transponder.

2. The insulating glazing unit according to claim 1, wherein the at least one RFID transponder is arranged at a corner of the insulating glazing unit.

3. The insulating glazing unit according to claim 2, wherein the at least one RFID transponder is arranged at a predetermined corner, which is specified based on a predetermined installation position of the insulating glazing unit in the frame.

4. The insulating glazing unit according to claim 2, wherein a RFID transponder is arranged at each corner of the insulating glazing unit.

5. A window comprising the frame and the insulating glazing unit according to claim 1, the insulating glazing unit being inserted into the frame.

6. A door comprising the frame and the insulating glazing unit according to claim 1, the insulating glazing unit being inserted into the frame.

7. A façade glazing with a construction that comprises the frame and the insulating glazing unit according to claim 1, the insulating glazing unit being inserted into the frame.

8. The insulating glazing unit according to claim 1, wherein the frame is a metallic frame.

* * * * *